United States Patent [19]

Richardson et al.

[11] 4,236,123
[45] Nov. 25, 1980

[54] HIGH-POWER CO LASER

[75] Inventors: Ralph J. Richardson, Ballwin; Charles E. Wiswall, Hazelwood; Richard L. Rasmussen, Florissant, all of Mo.

[73] Assignee: McDonnell Douglas Corporation, St. Louis, Mo.

[21] Appl. No.: 911,333

[22] Filed: Jun. 1, 1978

[51] Int. Cl.$^3$ ............................................. H01S 3/095
[52] U.S. Cl. ............................................. 331/94.5 G
[58] Field of Search ...................... 331/94.5 G, 94.5 P; 330/4.3

[56] References Cited

U.S. PATENT DOCUMENTS

| 4,115,168 | 9/1978 | Buonadonna et al. | 331/94.5 G |
| 4,131,863 | 12/1978 | Jeffers et al. | 331/94.5 G |

OTHER PUBLICATIONS

Richardson et al., "Thermochemical Generation of CS and S for CO Chemical Lasers," J. of Applied Physics, vol. 48, No. 6, Jun. 1977, pp. 2509-2514.

Primary Examiner—James W. Davie
Attorney, Agent, or Firm—Gravely, Lieder & Woodruff

[57] ABSTRACT

This application discloses a laser which is free from dependence on oxygen atom dissociators and does not require any electrical input. It is a purely chemical CO laser. This invention discloses a laser in which the combustion is fueled by a suitable fuel-oxidizer, e.g., $CH_4$—$H_2$—$CS_2$—$NF_3$, which dissociates the $CS_2$ into CS and S. The S atoms are generated in the combustor to initiate the chain reaction sequence in which the $S, O_2$ and CS react so that all of the CS is converted to excited CO which lases in the optical cavity.

8 Claims, 3 Drawing Figures

HIGH-POWER CO LASER

REFERENCE TO PRIOR APPLICATIONS

Jeffers, Kelly and Wiswall Ser. No. 648,273 filed Jan. 12, 1976 as continuation of Ser. No. 473,695 filed May 28, 1974, now U.S. Pat. No. 4,099,138 granted July 4, 1978 entitled "Chemically Fueled Laser" discloses a laser which uses CS as a fuel to react with O to produce excited CO. Buonadonna, Richardson, Rusmassen and Jeffers, Ser. No. 623,662 filed Oct. 20, 1975, now U.S. Pat. No. 4,115,168 granted Sept. 19, 1978 entitled "Carbon Monosulfide Generating Process" discloses a CS combustor in which CS is recovered as an entity and perserved by supersonic expansion for use in a laser. The ratio of $CS/CS_2$ is at least 2 in Ser. No. 623,662. Jeffers and Ageno Ser. No. 658,497 filed Feb. 17, 1976, now U.S. Pat. No. 4,131,863 granted Dec. 26, 1978 entitled "CO Chain Reaction Chemical Laser" discloses a chain reaction laser using O or S atom chain initiators which eliminates the oxygen dependence of the system.

BACKGROUND OF THE INVENTION

The CO chemical laser has been precluded from consideration as a high-energy laser because of sealing difficulties associated with the production of large quantities of atomic oxygen. The recent development disclosed in U.S. Pat. No. 4,131,863 of the chain-reaction CO chemical laser fueled with CS, $CS_2$, and O reduces, but does not obviate, the requirement for the chain initiators O and/or S. U.S. Pat. No. 4,115,168 discloses a method of producing CS for the CO chain-reaction laser from a thermochemical combustor fueled with $C_2N_2$—$O_2$—$CS_2$. This invention is concerned with an improved method of producing CS from a thermochemical generator fueled with $NF_3$—$CH_4$—$H_2$—$CS_2$ that also produces sufficient S to initiate the CS—$O_2$ chain, thereby allowing for the development of a combustion-driven CO chemical laser of any desired output power.

The chemistry of the CO chemical laser involves many reactions, but the basic reaction sequence consists of the following three steps.

(1) $CS_2 + O \rightarrow CS + SO$
(2) $CS + O \rightarrow CO + S$
(3) $S + O_2 \rightarrow SO + O$ In the conventional cw CO laser fueled with $CS_2$, these reactions produce approximately one CO molecule for every O atom supplied to the reaction zone. Since no practical technique for producing large quantities of atomic oxygen has been found, the CO chemical laser has remained a laboratory device.

By fueling the CO laser directly with CS in the chain-reaction laser, reaction (1) is bypassed, and one O atom produces many CO molecules through a chain reaction consisting of reactions (2) and (3). The CS molecule is, however, unstable and produces $CS_2$ from a heterogeneous reaction. Any residual $CS_2$ acts as a chain terminator through reaction (1) so that O atoms must still be supplied to the laser. In U.S. Pat. No. 4,131,863 which discloses the chain-reaction laser, CS was produced from the thermal dissociation of $CS_2$ in an electrical furnace, and O was produced from the dissociation of $O_2$ in a microwave discharge. The CS furnace produced $CS/CS_2$ ratios near 1.6 which resulted in approximately 10 CO molecules for each O atom. Such a device is not particularly suitable for scaling. However, by fueling the laser with CS and S from a thermochemical generator, a CO chemical laser unrestricted in power is possible. For this purpose, the $NF_3$—$CH_4$—$H_2$—$CS_2$-fueled combustor offers several advantages over the $C_2N_2$—$O_2$-fueled combustor previously reported: (1) the side product HF is expected to be less detrimental to laser performance than the CO from the $C_2N_2$—$O_2$ flame, (2) $NF_3$ is less toxic than $C_2N_2$, (3) the use of $CH_4$—$H_2$ permits optimization of the CS and S production by variation of the carbon-sulfur stoichiometry.

The present invention comprises a high power CO chemical laser which uses CS as fuel and S atoms in a chain reaction so that all of the CS is converted to excited CO. The S-atom chain initiators are thermochemically produced and the laser utilizes air as the oxidizer/diluent. The laser also utilizes a high pressure in the laser cavity compared to other gas lasers.

DETAILED DESCRIPTION

Figure 1:
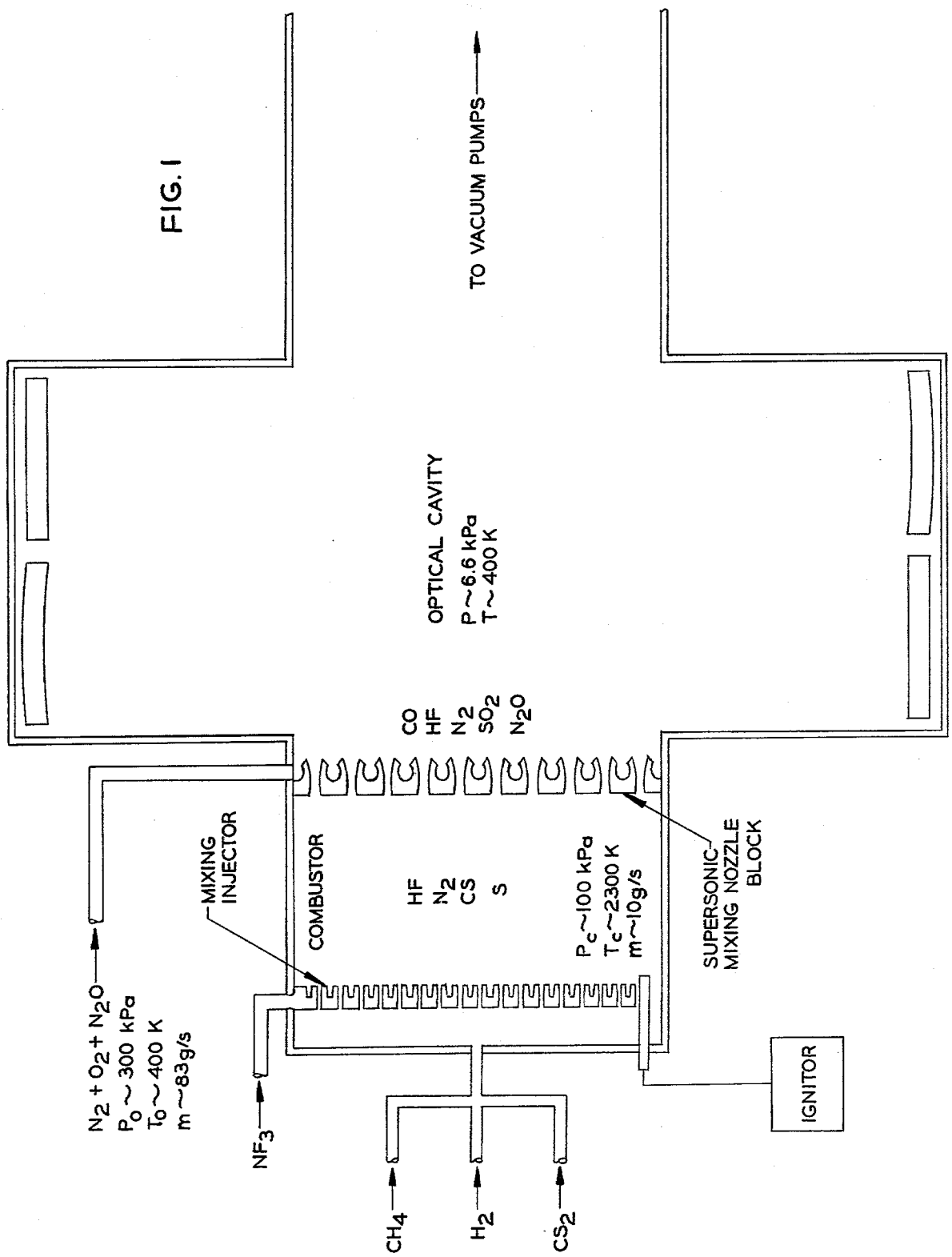
FIG. 1 is a schematic drawing of the combustor-driven chemical laser.

The combustor-driven, purely chemical laser utilizing carbon monoxide as the active medium is shown schematically in the attached drawings. The laser operates on carbon monosulfide and oxygen as a supersonic flow and mixing device, and has delivered approximately one-half kilowatt of cw optical power near 5 $\mu$m for periods up to two minutes. This device demonstrates that the CO chemical laser can be scaled to arbitrarily high power.

Only one other purely chemical laser, HF/DF, has demonstrated scalability to high cw output power levels, and the basic operating principles of the CO chemical laser are similar to it. However, advantages peculiar to the CO device are that it operates at relatively high cavity pressure ($\sim 6$ kPa) and utilizes dry air as the oxidizer/diluent. Its advantages over the high energy CO electric discharge laser (EDL) are zero electrical input and truly cw operation. These advantages become important for medium to high altitude military applications of high energy lasers.

CO Generation Chemistry

As previously stated, the dominant chemistry of the conventional CO chemical laser which utilizes $CS_2$ as fuel and atomic oxygen as oxidizer is described as follows.

(1) $CS_2 + O \rightarrow CS + SO$
(2) $CS + O \rightarrow CO^* + S$
(3) $S + O_2 \rightarrow SO + O$ Reaction (2) produces vibrationally excited CO with a non-Boltzmann, vibrational energy level population distribution that peaks at a vibrational quantum number $v = 13$. The CO vibrational, rotational transitions resulting from this distribution produce a rich spectrum of over 50 lines near 5 $\mu$m. However, reaction (2) can only proceed as long as CS is formed via reaction (1), and the quantity of CO produced depends directly on the quantity of atomic oxygen provided. For this reason, scaling of the conventional CO chemical laser is impractical. The extent of this problem can be reduced by fueling the device with CS, so that reactions (2) and (3) form a chain which produces many CO molecules for every O or S atom chain initiator supplied to the system.

This approach replaces the problem of obtaining oxygen atoms with the problem of obtaining CS molecules plus a reduced quantity of chain initiators O or S. In the present invention, we produce both CS and S by dissociation of $CS_2$ in a high temperature ($\gtrsim 2500$ K) flame and extraction by a supersonic expansion without excessive loss. Although CS reacts heterogeneously after several thousand wall collisions to form a carbonaceous wall deposit and gas phase $CS_2$, it is stable in the gas phase.

Since any residual $CS_2$ competes through reaction (1) with CS for the O produced from reaction (3), the ratio of CS to $CS_2$ and the ratio of S to CS from such a combustor must be sufficiently high to convert all of the CS to CO* in a practical length laser cavity. We have determined that the minimum practical CS to S ratio is about 20. We have used both a $C_2N_2$—$O_2$—$CS_2$ flame and an $NF_3$—$CH_4$—$H_2$—$CS_2$ flame.

LASER DESCRIPTION

Figure 2:
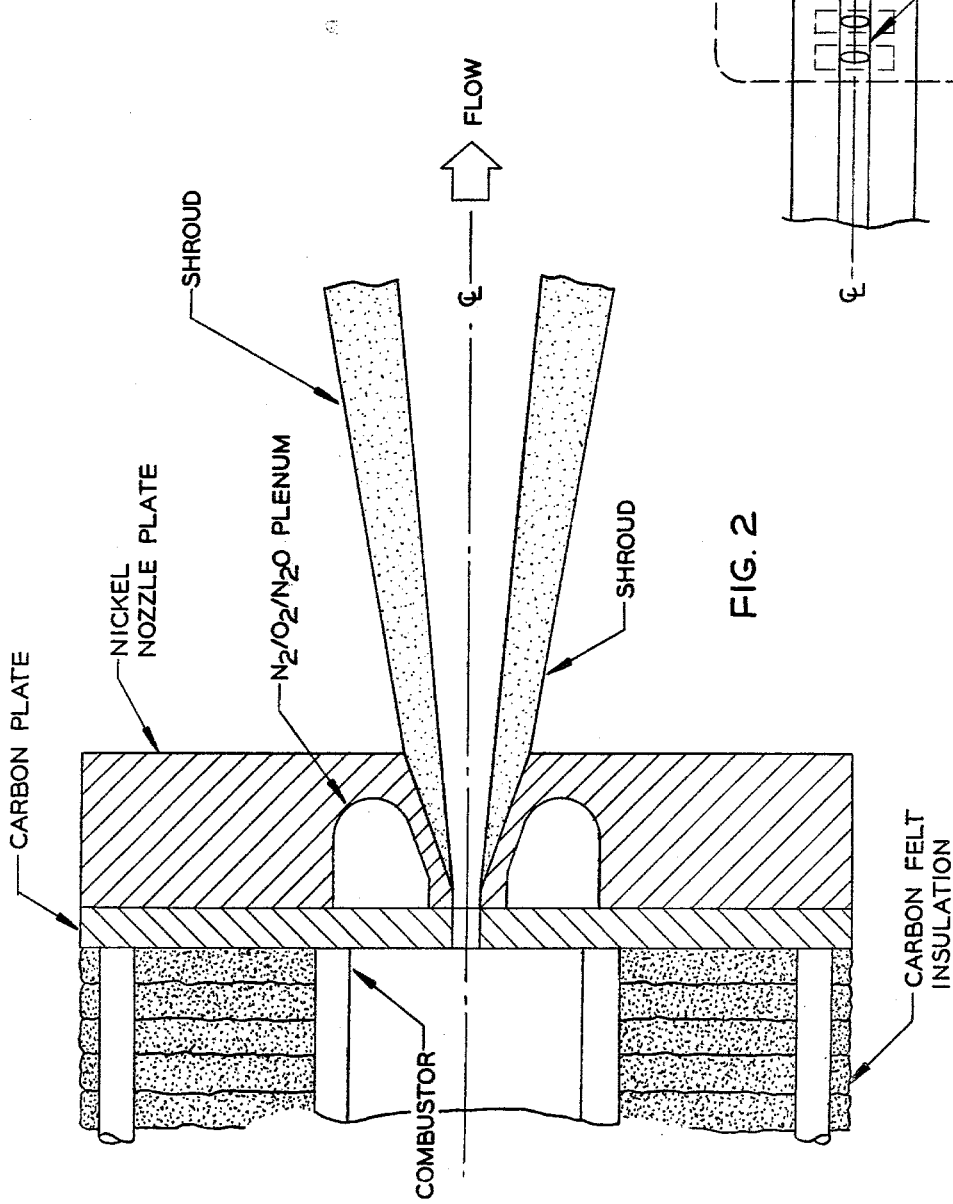
FIG. 2 is an enlarged fragmentary view of a portion of the common expansion nozzle.
Figure 3:
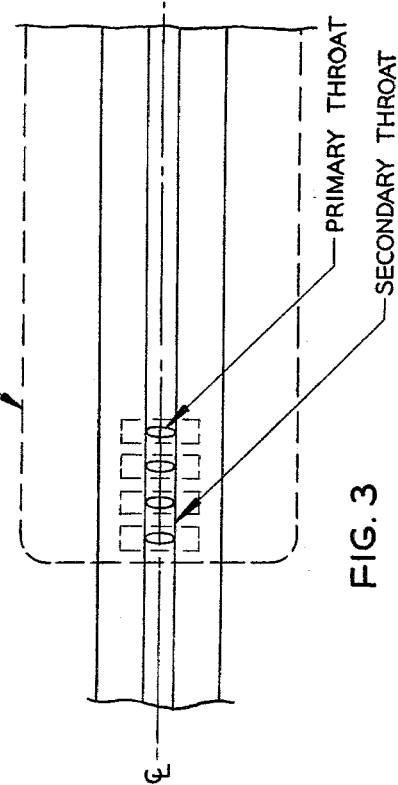
FIG 3 is a fragmentary view of the expansion nozzle.

The combustor-driven laser is schematically illustrated in FIG. 1. The CS and S are generated from the thermal dissociation of $CS_2$ in a high temperature (2500 K., 101 kPa) $NF_3$—$CH_4$—$H_2$ flame. The concentration ratios of the products of this flame (HF, $N_2$, CS, S, and $CS_2$) are dependent on the stochiometry and heat loss in the combustor, but CS to $CS_2$ ratios near 5 sufficient to fuel the laser are routinely obtained. The combustion products are preserved by a rapid expansion through a series of supersonic jets in the mixing nozzle which also injects dry air and $N_2O$ into the flow stream. The combined fluids mix and react in the common expansion region of the nozzle which is also the laser cavity (FIG. 2). The heat capacity of the air and the Mach 2 supersonic expansion ultimately cool the final mixture to approximately 400 K. and reduce the pressure to about 6 kPa. In the laser cavity, CS is converted to CO by the reactions (2) and (3) which form a chain sequence until all of the CS is depleted, provided sufficient S is also available from the combustor.

Compared to HF* produced in the more familiar HF chemical laser, the CO* produced in the CO chemical laser is relatively insensitive to deactivation by collisions. Consequently, the CO laser is capable of operating at the relatively high pressures of about 3 kPa and more and the active zone of the laser extends over 20 cm downstream from the nozzles. The additive gas $N_2O$ is not involved in the chemistry of the laser but is added to the air in the secondary nozzles since the deactivation of CO by $N_2O$ as a function of vibrational level results in a more favorable overall inversion ratio and permits extraction of more power from the CO system. The optics in this demonstration device consist of four 10 cm diam mirrors [two plano and two concave (r=10)] which are normally operated as two separate 80 cm resonators.

The laser has produced 450 W of power and is normally operated for 30 s at a time to conserve fuel, although it has been operated for 120 s for some tests, and multiple starts and stops are routine. Little degradation of the major laser components has been observed over some 2000 s of operation. The nozzle throats do become clogged with carbon platelets if the proper combustor stoichiometry is not maintained.

The efficiency of this demonstration device is about 4.5 J/g, but predictions for large scale devices utilizing He as a diluent exceed 200 J/g. Since the modeling code also predicts efficient laser performance at cavity pressures of 13 kPa, a device with high Mach number flow can be exhausted directly to the atmosphere. Consequently, certain aspects of the CO chemical laser, such as high pressure operation and use of air as oxidizer/diluent, are advantages for certain high energy applications.

What is claimed is:

1. A method of producing a chain reaction CO chemical laser comprising the steps of
    (a) thermochemically converting $CS_2$ into CS and S
    (b) combining the CS and S with a stream of $O_2$ oxidizer and diluent to produce vibrationally excited CO resulting in an inverted population of CO,
    (c) passing the CO through a resonant optical cavity to obtain continuous stimulated emission of radiation from the CO, and
    (d) extracting a coherent laser beam from the optical cavity.

2. The method of claim 1 wherein the oxidizer and diluent combination is dry air.

3. The method of claim 1 wherein the ratio of CS to $CS_2$ in the feed is at least about 5.

4. The method of claim 1 wherein the ratio of CS to S in the feed is at least about 20.

5. The method of claim 1 wherein the thermochemical conversion is caused by a $C_2N_2$—$O_2$—$CS_2$ flame.

6. The method of claim 1 wherein the thermochemical conversion is caused by a $NF_3$—$CH_4$—$H_2$—$CS_2$ flame.

7. The method of claim 1 wherein the CS and S are extracted from the thermochemical conversion by a supersonic expansion to preserve them as entities for the subsequentlasing reaction.

8. The method of claim 1 wherein the resonant optical cavity is at a pressure of about 3 kPa or more.

* * * * *